June 5, 1951 W. H. HARSTICK ET AL 2,555,540
TINWARE CONSTRUCTION FOR POWER WASHING SEPARATORS
Filed July 24, 1947 2 Sheets-Sheet 1
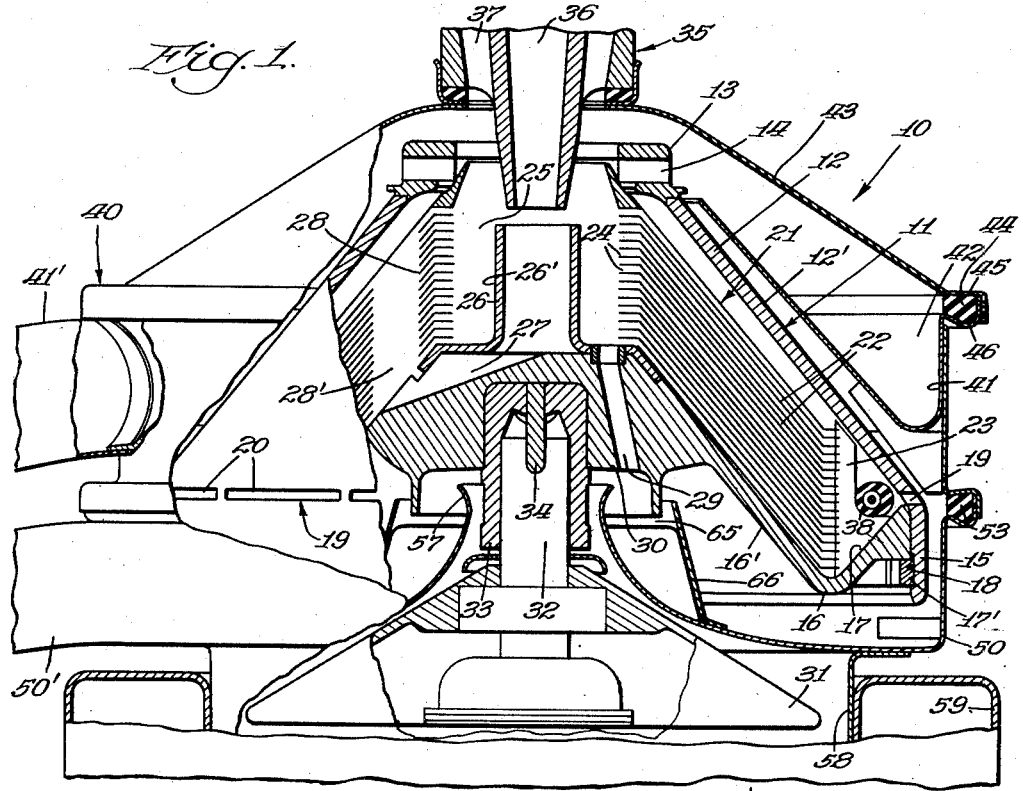
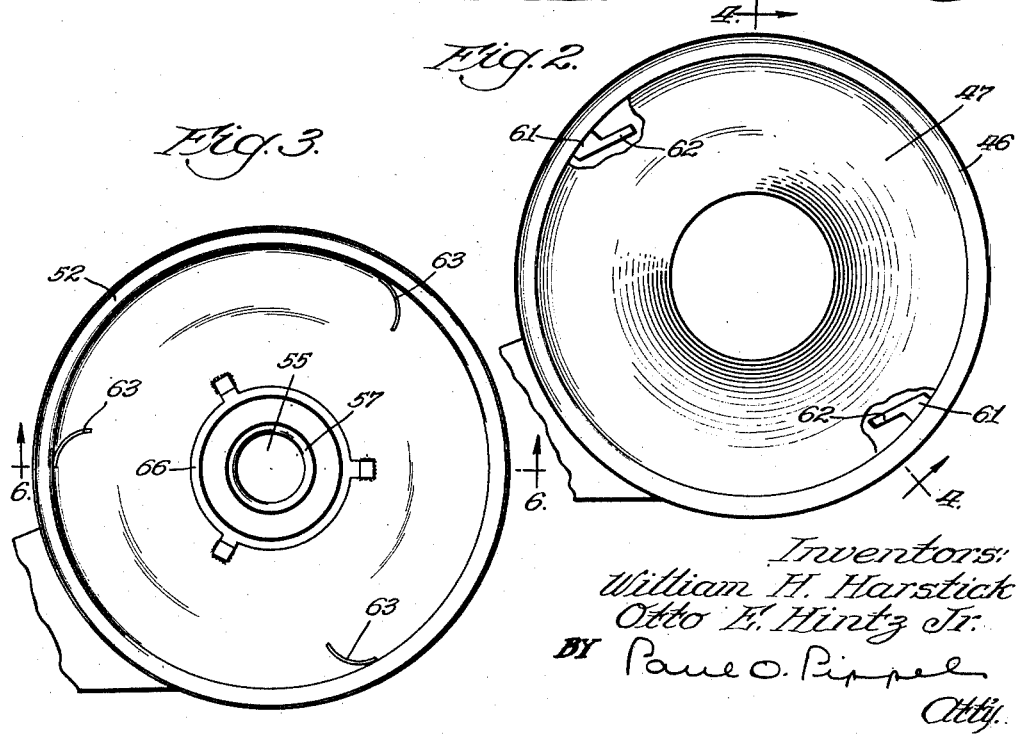

June 5, 1951   W. H. HARSTICK ET AL   2,555,540
TINWARE CONSTRUCTION FOR POWER WASHING SEPARATORS
Filed July 24, 1947   2 Sheets-Sheet 2
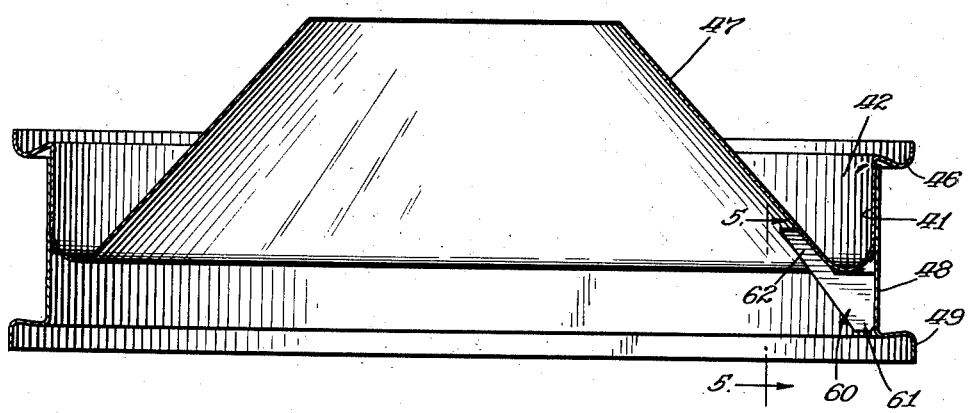
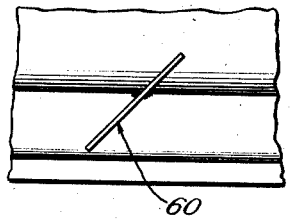
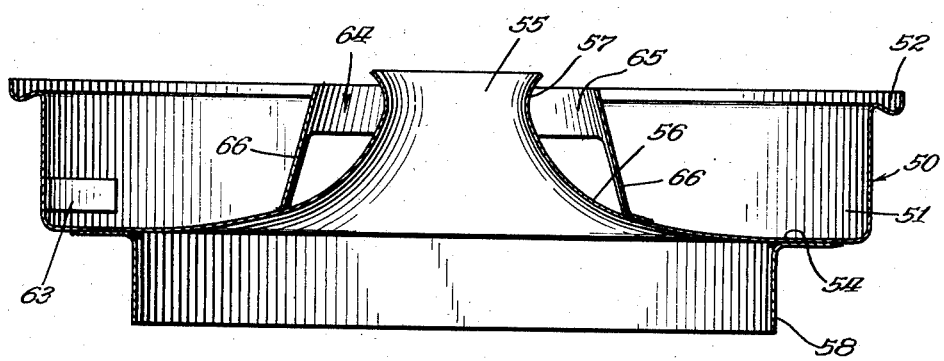
Inventors:
William H. Harstick
Otto E. Hintz Jr.
BY Paul O. Pippel
Atty.

Patented June 5, 1951

2,555,540

UNITED STATES PATENT OFFICE 2,555,540

TINWARE CONSTRUCTION FOR POWER WASHING SEPARATORS

William H. Harstick, Oak Park, and Otto E. Hintz, Jr., Chicago, Ill., assignors to International Harvester Company, a corporation of New Jersey Application July 24, 1947, Serial No. 763,372

16 Claims. (Cl. 233—1)

This invention relates to a centrifugal separator construction, and more particularly to a power washing cream separator. More specifically, this invention relates to means for washing a separating bowl and the stationary tinware construction of a cream separating device.

In applicants' construction a self-washing cream separating bowl is provided. Generally, this bowl includes a pack of superposed separating discs and cream and skim milk outlets. At the maximum periphery of the bowl a washing liquid discharge opening is provided. Valve means are centrifugally operable to regulate the discharge of washing liquid from the discharge opening. Washing water may be introduced into the separating bowl by means of a washing liquid and whole milk supply nozzle. The cream separating bowl is rotated within a tinware structure which is constructed to receive the skim milk and the discharged cream.

In applicants' construction the interior parts of the bowl may be completely flushed with a washing liquid after the separating operation is completed without the necessity of having the operator disassemble the individual bowl parts. In order to effect complete washing of the bowl so that none of the individual parts of the separator must be removed for washing, it is desirable to completely wash the stationary tinware construction and more particularly to wash the outer surfaces of the separating bowl.

It is applicants' prime object therefore, to provide a construction wherein the outer surfaces of a separating bowl may be completely flushed clean by utilizing the washing liquid that escapes from the interior of the bowl.

It is another object to provide a stationary tinware construction having a skim milk receiving chamber and a cream receiving chamber, said chambers being provided with deflector means arranged to flush the outer surfaces of a separating bowl.

It is another object to provide a stationary tinware construction for a power washing cream separating bowl, said tinware construction having deflector means arranged to completely wash the top and underneath surfaces of the bowl.

Still another object is to provide a stationary tinware construction for a cream separating bowl, said tinware construction including cylindrical chambers having deflector members at the maximum internal periphery thereof which are arranged to deflect washing liquid, escaping from the separating bowl, inwardly over the top and underneath surfaces of the bowl.

A further object is to provide a tinware construction for a power washing cream separating bowl, said tinware construction including a cream receiving chamber having an opening centrally positioned thereof, said opening being surrounded by an annular deflector shield having flared surfaces arranged to deflect washing liquid upwardly against the underneath surfaces of the cream separating bowl.

A still further object is to provide a cream separating construction, said cream separator including an outlet extending downwardly near the axis of the bowl and a tinware construction for receiving cream from said outlet, said tinware construction including a cream collecting member positioned radially outwardly of said cream outlet, said collector member being arranged to deflect the cream downwardly into the chamber as it is discharged from the cream outlet.

These and other objects will become more readily apparent upon a reading of the specification when examined in connection with the drawings.

In the drawings, Figure 1 is a partial sectional view in elevation of a centrifugal separating device.

Figure 2 is a partial plan view of a skim milk receiving receptacle forming a part of a stationary tinware construction.

Figure 3 is a partial plan view of a cream receiving receptacle forming part of a stationary tinware construction.

Figure 4 is a sectional view taken along the line 4—4 of Figure 2.

Figure 5 is a fragmentary view taken along the line 5—5 of Figure 4.

Figure 6 is a sectional view taken along the line 6—6 of Figure 3.

Referring particularly to Figure 1 of the drawings, a cream separating device is generally designated by the reference character 10. The cream separating device includes a revoluble or rotating cream separating bowl 11. The bowl 11 has an upper bowl shell 12 having downwardly extending sloping outer surfaces 12'. The bowl shell 12 is provided at its upper end with a collar portion 13 having therein a plurality of skim milk outlets 14. The lower end of the bowl shell 12 is provided with a circumferentially extending rim 15. The rim 15 is in telescoping engagement with a lower bowl portion generally designated by the reference character 16. The lower bowl portion 16 is provided with sloping surfaces 16' substantially parallel to the surfaces 12' of the upper bowl shell 12. The lower bowl portion 16 also includes a circumferentially upwardly tapering surface 17 which is in sliding telescoping relation with the circumferentially extending rim 15. A snap ring 17' is in engagement with a recess 18 in the rim 15, said snap ring serving to retain the upper bowl shell and the lower bowl portion in assembled relation.

The bowl 11 is provided at its maximum internal periphery with a substantially continuous circumferential discharge opening 19. The discharge opening 19 is made up of a plurality of circumferential slots 20.

A disc pack 21 is securely held between the upper bowl shell 12 and the lower bowl portion 16. The disc pack 21 includes a plurality of frusto-conical superposed separating discs 22. The outer ends of the separating discs 22 are supported by means of a plurality of supporting wings 23, only one of which is shown. Each separating disc 22 is provided with a central circular opening 24 forming an inner peripheral edge on each disc. The circular openings 24 are in alignment with one another and provide a vertically extending cylindrical space 25. A milk inlet tube 26 is provided within this space. The milk inlet tube 26 has an outer cylindrical surface 26' which is of substantially less diameter than the outwardly extending cylindrical space 25. The inlet tube 26 is constructed to rotate with the bowl 11 and is in communication with a series of circumferentially spaced distributing chambers 27, only one of which is shown. Each separating disc is provided with an eccentrically disposed opening 28, the opening of each disc being in alignment with the other to form a vertically extending passage 28'. Only one passage 28' is shown, but a plurality of passages are circumferentially spaced in the disc pack and each one is in communication with a distributor chamber 27.

The bowl 11 is provided with a cream outlet 29. The cream outlet 29 extends through the bottom of the lower bowl portion 16 for communication with a dished portion or annular collar 30 projecting downwardly from the lower surface of the separating bowl. Only one cream outlet is shown, but more than one may be utilized.

The separating bowl 11 may be rotated by any power means. For the purpose of this disclosure applicants have provided a power device indicated by the reference character 31. This power device is in the form of an electric motor having a driving shaft 32 extending upwardly into the lower bowl portion 16. The driving shaft 32 is slid into a sleeve 33 and securely locked in driving engagement by means of a key 34.

A supply can nozzle 35 is positioned above the bowl 11 and is in axial alignment therewith. The supply can nozzle 35 includes a milk feed tube 36 for supplying whole milk to the milk inlet tube 26 with which it is in communication. A washing liquid supply tube 37 is disposed above the milk feed tube 36 for supplying washing liquid to the interior of the separating bowl.

A circumferentially extending sealing ring 38 or valve element is supported by the supporting wings 23 and is adapted to expand and contract for centrifugally closing and opening the substantially continuous discharge opening 19 during changes in the speed of rotation of the bowl. This description is deemed sufficient for the valve element and further description is given in William Harstick's application, for "Cream Separator" filed June 24, 1946, Serial Number 678,863, which has matured into Patent 2,504,261 relating to a centrifugal separator.

Positioned outwardly of, and surrounding the cream separating bowl 11, is a stationary tinware construction generally designated by the reference character 40. The tinware construction 40 includes a cylindrical skim milk receiving receptacle 41. The receptacle 41 is provided with a skim milk receiving chamber 42 arranged to receive milk from the outlets 14. A removable cover 43 is placed over the milk receiving receptacle 41. A sealing member 44 is arranged to engage flared rims 45 and 46 provided respectively in the cover 43 and the receptacle 41. As best shown in Figures 1 and 4 the receptacle 41 is provided with a frusto-conical bottom 47 which is substantially parallel to the upper surfaces 12' of the cream separating bowl 11. The receptacle 41 also includes a downwardly extending cylindrical portion 48 having an outwardly extending peripheral flared rim 49.

A cream receiving receptacle is designated by the reference character 50 and is best shown in Figures 1, 3, and 6. The cream receiving receptacle 50 includes a cream receiving chamber 51. The receptacle is also cylindrical in shape and is provided at its outer periphery with an outwardly extending flared rim 52. The flared rim 52 is arranged to receive a resilient sealing member 53 which is also arranged to engage the flared edge 49 of the milk receiving receptacle. The cream receptacle 50 is further provided with a bottom 54. The bottom 54 has provided therein a centrally disposed opening 55 surrounding the driving member 32 of the electric motor 31 as best shown in Figure 1. The bottom portion 54 has near its center a deflector shield 56. The deflector shield 56 is annular in shape and extends inwardly upwardly to a point adjacent the sleeve 33. At this point the deflector flares forwardly and outwardly of the sleeve 33 as best shown at 57.

As best shown in Figure 6, the cream receiving receptacle 50 is provided with a downwardly extending collar 58. The collar 58 engages supporting members 59, thus providing a rigid stationary tinware construction for the cream separating device. The tinware construction rests upon the supporting members 59 and is securely held thereon by the weight of a supply can (not shown) and by means of the supply can nozzle 35 which engages the cover 43. The skim milk receiving chamber is provided with a milk spout 41' and the cream receiving receptacle 50 is provided with a cream spout 50'.

A pair of circumferentially spaced deflector members 60 are provided at the maximum internal periphery of the cream receiving chamber 50. The deflector members 60 are provided with a substantially wide body 61 and a narrow sloping vane-like member 62, said deflector being rigidly secured to the underside of the frusto-conical bottom 47 of the milk receiving receptacle 41.

As best shown in Figure 3, the cream receiving receptacle 50 is provided with deflector members 63. The deflector members 63 are arcuate in shape and are circumferentially spaced at the maximum internal periphery of the chamber 51. The purpose of these deflector members will presently become more apparent.

A cream collecting ring 64 is centrally disposed within the cream receiving chamber 51. The cream collecting ring 64 includes a cylindrical, substantially narrow band 65 having its inner peripheral edge positioned outwardly and immediately adjacent of the cream outlet 29. The cream collecting ring 64 is supported in an elevated manner within the chamber 51 by means of downwardly extending leg members 66 which are securely fastened to the bottom 54 of the receptacle 50.

During the operation of the cream separator 10, whole milk from a supply can (not shown) is delivered downwardly into the distributing chambers 27, thereupon upwardly into the passages 28' where it is separated into the constituents of skim milk and cream. The skim milk escapes through the skim milk openings 14 and is collected within the skim milk receiving chamber 42, whereupon it is delivered into a suitable container (not shown) by means of the skim milk spout 41'. The separated cream courses downwardly through the cream outlet 29. In view of the centrifugal force developed by the rotating bowl, the cream flows in a path along the inner maximum periphery of the dished portion 30.

At this point in conventional designs, the cream would leave the dished portion 30 of the bowl 11 and thereby be thrown centrifugally outwardly into the outer peripheral end of the chamber 50. In a construction therefore, where the cream is thus thrown outwardly by the centrifugal force, atomization and whipping action of the cream will take place. This is an extremely undesirable result and therefore applicants provide the cream collector 64 which is arranged to deflect the cream downwardly into the chamber 50 immediately after it reaches the maximum internal periphery of the dished portion 30. Thus the cream leaves the dished portion 30 and is thrown against the ring band 65, whereupon it stops its centrifugal outward course and is free to course downwardly into the cream receiving chamber 50. In this manner, therefore, the cream is maintained in its original form and is not atomized or agitated to a detrimental degree. The cream leaves the cream receiving chamber 50 by means of the cream nozzle 50'.

After the separating operation has taken place, it is then desired to wash the inner and outer parts of the separating bowl as well as the tinware construction. At this stage of the operation the cream separating bowl is rotating at a substantially high speed, though the speed of rotation can be considerably less than in the separating operation. At this speed the centrifugal valve or sealing ring 38 is still expanded outwardly, thus closing off the circumferentially extending discharge opening 19. A substantial amount of washing liquid is then introduced into the bowl. The washing liquid courses down through the milk supply tube 36 and the washing liquid tube 37. A sufficient amount of water is introduced at this time, whereupon the water overflows the bowl. During this stage of the operation the washing liquid and slime washed from inside the bowl escapes through the skim milk outlets 14 as well as over the collar portion 13 and then courses outwardly and downwardly into the skim milk receiving chamber 14', thus thoroughly washing this chamber. The washing liquid thereupon escapes through the skim milk outlet 41'.

After the skim milk outlet 41' and the chamber 42 have been securely washed in this manner the speed of rotation of the bowl is substantially lowered. Washing liquid is then introduced into the bowl in the same manner. During washing, liquid impinges upon the inner peripheral edges of the discs 22 and thereupon is thrown centrifugally outwardly between the discs, thereby washing the interior parts of the bowl. Due to the lowered speed of rotation of the bowl the ring 38 has now contracted sufficiently so that the circumferential discharge opening 19 is open. The washing liquid thereupon is centrifugally forced outwardly through this opening. Only a small amount of washing liquid suffices to wash the cream outlet 29 and courses downwardly therethrough. The escaping washing liquid, which is thrown outwardly through the peripheral opening 19, is thrown against the deflector members 60 and 63. As a result of the particular shape of the deflector members 60 and 63, the washing liquid is then thrown or directed radially inwardly toward the axis of the bowl. The deflector 60 serves to direct sufficient washing liquid inwardly to thoroughly flush and clean the upper bowl surfaces 12' of the separating bowl 11. The deflector members 63 serve to direct sufficient washing liquid inwardly to thoroughly wash and clean the lower surfaces 16' of the lower bowl portion 16. The circumferentially extending rim 15 of the bowl is effectively washed since the discharge opening is provided immediately adjacent said rim.

In view of the construction of the dished portion 30 and the collector ring 65 it is desired that very effective means be provided to assure washing of the bowl portion at this point. Applicants have provided the deflector shield 56 for this purpose. The deflector shield 56 is so shaped and flared at its upper end that when the washing liquid is thrown inwardly by means of the deflector members 63, it is then thrown upwardly into the dished portion 30 against all the inner surfaces thereof and also against the cream collecting ring 64. In this manner these bowl parts are efficiently washed. The flared portion 57 of the deflector shield 56 also serves to retain the washing liquid within the chamber 58, thereby preventing splashing of said washing liquid into the driving member and the electric motor. As the bowl is rotated the washing liquid is moved to all inner portions of the cream separating bowl and the tinware and effective cleaning is accomplished. The washing liquid thereupon escapes through the cream outlet 50'.

It can thus be seen that the objects of the invention have been fully achieved and that applicants have provided a novel and efficient means for washing the inner and outer surfaces of a cream separating bowl and the tinware construction associated therewith without the necessity or requirement that any parts of the centrifugal separating device be taken apart for this purpose. Thus an efficient construction has been devised which clearly accomplishes the desirable objects sought to be attained.

It is to be understood that changes and modifications may be made in this construction which do not depart from the spirit of the invention as disclosed nor the scope thereof as defined in the appended claims.

What is claimed is:

1. In a centrifugal separator, a revoluble bowl having outlets for discharging the separated materials, a plurality of separating discs within the bowl, means for directing washing liquid to said bowl, and peripheral valve means movable to control the discharge of washing liquid from said bowl, the combination therewith of a plurality of receptacles outside said bowl for receiving the separated materials, said receptacles including deflecting elements projecting inwardly from the receptacles toward the bowl and arranged to direct the discharged washing liquid toward portions of said revoluble bowl thereby washing the outer surfaces of said bowl and the inner surfaces of said receptacles.

2. In a centrifugal cream separator, a rotatable bowl having outlets for the liquid to be treated, means for directing washing liquid within said bowl, and valve means for controlling the discharge of washing liquid from said bowl, the combination therewith of a stationary receptacle outside said bowl for receiving the discharged liquids, said receptacle including deflector means projecting inwardly from the receptacle toward the bowl and arranged to direct the discharged washing liquid toward the bowl thereby washing the outer surfaces of said bowl.

3. In a centrifugal cream separator, a revoluble bowl having skim milk and cream outlets, a plurality of separating discs within the bowl, means for directing washing liquid to said bowl, and valve means for said bowl, said valve means being operable by centrifugal force to control the discharge of washing liquid from said bowl, the combination therewith of a stationary tinware construction for receiving the separated liquids, said tinware construction including a milk receiving receptacle and a cream receiving receptacle, and deflector means arranged between said bowl and said tinware, the deflector means projecting angularly inwardly toward the bowl and arranged to direct the discharged washing liquid toward said bowl for washing the outer surfaces of said bowl.

4. In a centrifugal separator, a revoluble bowl having outlets for discharging the separated materials, a plurality of separating discs within the bowl, means for directing washing liquid to said bowl, and movable means for controlling the discharge of the washing liquid from said bowl, the combination therewith of a stationary receptacle outside of said bowl, said receptacle including circumferentially disposed inwardly projecting elements arranged to deflect the discharged washing liquid toward said bowl thereby washing the outer surfaces of said bowl.

5. In a centrifugal separator, a revoluble bowl having outlets near its axis for the liquid to be treated, a plurality of separating discs within the bowl, means for directing washing liquid to said bowl, said bowl having a peripheral discharge opening, valve means for said discharge opening, said valve means being centrifugally operable to control the discharge of washing liquid from said bowl, the combination therewith, of a stationary housing enclosing said bowl, said housing including receptacles for receiving the separated liquids, deflector elements circumferentially disposed and connected to said receptacle to project inwardly toward the bowl and arranged to deflect the discharged washing liquid radially inwardly against said bowl thereby washing the outer surfaces of said bowl.

6. In a power washing centrifugal cream separator, a revoluble bowl having a skim milk and a cream outlet near its axis, said cream outlet extending through the bottom of said bowl, a plurality of separating discs within the bowl, means for supplying whole milk and washing liquid to said bowl, said bowl having a peripheral discharge opening and valve means centrifugally operable to regulate the discharge of washing liquid through said opening, the combination therewith of a stationary tinware construction surrounding said bowl for receiving the discharge of liquid therefrom, said tinware construction including a cylindrical skim milk receiving chamber positioned above said bowl, a cylindrical cream receiving chamber enclosing said bowl and arranged to receive cream from said cream outlet, and inwardly extending deflector members circumferentially spaced at the maximum internal periphery of said cream receiving chamber, said deflector members being axially spaced above and below the peripheral discharge opening and being arranged to direct the washing liquid underneath and above the bowl toward the axis thereof, thereby washing the outer surfaces of said bowl.

7. In a power washing centrifugal cream separator, a revoluble bowl having a skim milk and a cream outlet near its axis, means for supplying whole milk and washing liquid to said bowl, said bowl having a peripheral discharge opening and valve means centrifugally operable to regulate the discharge of washing liquid through said opening, the combination therewith of a stationary tinware construction including a cylindrical skim milk receiving chamber positioned above above said bowl, a cylindrical cream receiving chamber enclosing said bowl, and radially inwardly extending deflector members circumferentially spaced at the maximum internal periphery of said cream receiving chamber, said deflector members being positioned above and below the maximum peripheral edges of said bowl, and arranged to direct the washing liquid inwardly underneath and above the bowl, thereby washing the outer surfaces of said bowl.

8. In a power washing centrifugal cream separator, a revoluble bowl having a skim milk and a cream outlet, means for supplying whole milk and washing liquid to said bowl, said bowl having a peripheral discharge opening and valve means centrifugally operable to regulate the discharge of washing liquid through said opening, a driving member centrally supporting said bowl, a power unit for rotating said driving member and said bowl, the combination therewith of a stationary tinware construction, said tinware construction including a cylindrical skim milk receiving chamber and a cylindrical cream receiving chamber, said bowl being positioned within said cream receiving chamber, deflector members circumferentially spaced at the maximum internal periphery of said cream receiving chamber, said deflector members being arranged to direct the washing liquid inwardly underneath and above said bowl, and an annular deflecting shield encircling in spaced relation said driving member, said deflecting shield extending inwardly and upwardly to a point adjacent said driving member and being flared upwardly and outwardly from said point, said deflecting shield being arranged to direct the washing liquid upwardly against the bottom surface of said bowl and in a direction outwardly of said driving member thereby washing said bowl.

9. In a power washing centrifugal cream separator having a revoluble bowl, means for supplying whole milk and washing liquid to said bowl, said bowl having a peripheral discharge opening, valve means centrifugally operable to regulate the discharge of washing liquid through said opening, a skim milk outlet for said bowl, a cream outlet extending through the lower portion of said bowl, the combination therewith of a tinware construction having a skim milk receiving chamber and a cream receiving chamber, said cream receiving chamber having a centrally positioned opening in the bottom portion thereof, deflector means within said cream receiving chamber for deflecting said washing liquid inwardly to wash the outer surfaces of said bowl, a deflector shield around the opening in said cream receiving chamber, said deflector shield extending inwardly and upwardly, and being flared outwardly for diverting washing liquid toward the lower surface of said bowl, and a cream collecting ring within said cream receiving chamber, said ring having its inner peripheral edge positioned outwardly of said cream outlet and arranged to collect and downwardly deflect the cream discharged from said bowl.

10. In a power washing centrifugal cream separator, a revoluble bowl having a skim milk and a cream outlet, a plurality of separating disks within the bowl, means for supplying whole milk and washing liquid to said bowl, said bowl having a peripheral discharge opening and valve means centrifugally operable to regulate the discharge of washing liquid through said opening, the combination therewith of a stationary tinware construction outside said bowl for receiving the discharge of liquid therefrom, said tinware construction including a skim milk receiving chamber, a cream receiving chamber enclosing said bowl and arranged to receive cream from said cream outlet and inwardly projecting deflecting elements within said cream receiving chamber, said deflecting elements being arranged to direct the washing liquid underneath and above the bowl toward the axis thereof, thereby washing the outer surfaces of said bowl.

11. In a power washing centrifugal cream separator, a revoluble bowl having a skim milk and a cream outlet, means for supplying whole milk and washing liquid to said bowl, said bowl having a peripheral discharge opening and valve means centrifugally operable to regulate the discharge of washing liquid through said opening, a driving member arranged to drive said bowl, a power unit for rotating said driving member, the combination therewith of a stationary tinware construction, said tinware construction including a skim milk receiving chamber and a cream receiving chamber, inwardly projecting deflector members at the maximum internal periphery of said cream receiving chamber, said deflector members being arranged to direct the washing liquid inwardly toward said bowl, and an annular deflecting shield encircling in spaced relation said driving member, said deflecting shield extending inwardly and upwardly to a point adjacent said driving member and being flared upwardly and outwardly from said point, said deflecting shield being arranged to direct the washing liquid upwardly against the bottom surface of said bowl and in a direction outwardly of said driving member thereby washing said bowl.

12. In a power washing centrifugal cream separator, a revoluble bowl having a skim milk and a cream outlet, means for supplying whole milk and washing liquid to said bowl, said bowl having a peripheral discharge opening and valve means centrifugally operable to regulate the discharge of washing liquid through said opening, a driving member arranged to drive said bowl, the combination therewith of a stationary tinware construction, said tinware construction including a skim milk receiving chamber, and a cream receiving chamber, deflector members within said cream receiving chamber, said deflector members being arranged to direct the washing liquid inwardly toward said bowl, and a deflecting shield encircling in spaced relation said driving member, said deflecting shield extending inwardly and upwardly adjacent said driving member and being flared outwardly, said deflecting shield being arranged to direct the washing liquid upwardly against the bottom surface of said bowl and in a direction outwardly of said driving member thereby washing said bowl.

13. In a power washing centrifugal cream separator, a revoluble bowl having a skim milk and a cream outlet, means for supplying whole milk and washing liquid to said bowl, said bowl having a peripheral discharge opening and valve means centrifugally operable to regulate the discharge of washing liquid through said opening, a driving member arranged to drive said bowl, the combination therewith of a stationary tinware construction, said tinware construction including a skim milk receiving chamber and a cream receiving chamber, inwardly projecting deflector members within one of said receiving chambers, said deflector members being arranged to direct the washing liquid inwardly toward said bowl, and a deflecting shield encircling in spaced relation said driving member, said deflecting shield being arranged to direct the washing liquid against an outer surface of said bowl.

14. In a power washing centrifugal cream separator having a revoluble bowl, means for supplying whole milk and washing liquid to said bowl, said bowl having a peripheral discharge opening, valve means centrifugally operable to regulate the discharge of washing liquid through said opening, a skim milk outlet for said bowl, a cream outlet extending through the lower portion of said bowl, the combination therewith of a tinware construction having a skim milk receiving chamber and a cream receiving chamber, said cream receiving chamber having a centrally positioned opening in the bottom portion thereof, deflector means within said cream receiving chamber for deflecting said washing liquid inwardly to wash the outer surfaces of said bowl, an annular deflector shield around the opening in said cream receiving chamber, said deflector shield being arranged to divert washing liquid toward the lower surface of said bowl, a cream collecting ring within said cream receiving chamber, and upwardly extending leg members for supporting said ring within the cream receiving chamber, said ring having its inner peripheral edge positioned outwardly of said cream outlet and arranged to deflect the cream discharged from said bowl.

15. In a power washing centrifugal cream separator having a revoluble bowl, means for supplying whole milk and washing liquid to said bowl, said bowl having a peripheral discharge opening, valve means centrifugally operable to regulate the discharge of washing liquid through said opening, a skim milk outlet for said bowl, a cream outlet for said bowl, the combination therewith of a tinware construction having a skim milk receiving chamber and a cream receiving chamber, deflector means within said cream receiving chamber for deflecting said washing liquid to wash the outer surfaces of said bowl, a deflector shield arranged to direct washing liquid to an outer surface of said bowl, a cream collecting ring within said cream receiving chamber, and upwardly extending leg members for supporting said ring on the tinware construction within said cream receiving chamber, said ring being positioned and arranged to deflect the cream discharged from said bowl.

16. In a centrifugal cream separator having a rotatable bowl, means for supplying whole milk to the bowl, a cream outlet on the underneath side of the bowl substantially near the axis of said bowl, an annular collar connected to said bowl for rotation therewith, said collar projecting downwardly from the underneath side of the bowl and having an annular inner surface spaced radially outwardly of the cream outlet, the combination therewith of a tinware structure enclosing said bowl, said tinware structure including a cream receiving chamber, a stationary cream collecting ring encircling said collar, said ring being arranged to deflect cream from a radially outward course, downwardly into said cream receiving chamber, and means connected to said tinware structure for supporting said ring in an elevated position within said cream receiving chamber.

WILLIAM H. HARSTICK.
OTTO E. HINTZ, Jr.

REFERENCES CITED

The following references are of record in the file of this patent:

UNITED STATES PATENTS

| Number | Name | Date |
|---|---|---|
| 720,479 | Price | Feb. 10, 1903 |
| 964,505 | Forsberg | July 19, 1910 |
| 1,429,331 | Feldmeier | Sept. 19, 1922 |
| 1,517,441 | Lindgren | Dec. 2, 1924 |
| 1,873,185 | Clark | Aug. 23, 1932 |
| 1,923,454 | Peltzer et al. | Aug. 22, 1933 |
| 2,173,579 | Fawcett | Sept. 19, 1939 |
| 2,173,580 | Fawcett | Sept. 19, 1939 |
| 2,477,982 | Hintz | Aug. 2, 1949 |

FOREIGN PATENTS

| Number | Country | Date |
|---|---|---|
| 181,686 | Great Britain | Oct. 5, 1922 |